April 9, 1963 D. ROBERTS 3,084,661
PROCESS AND APPARATUS FOR IMPREGNATING FIBROUS MATERIALS
Filed May 23, 1960
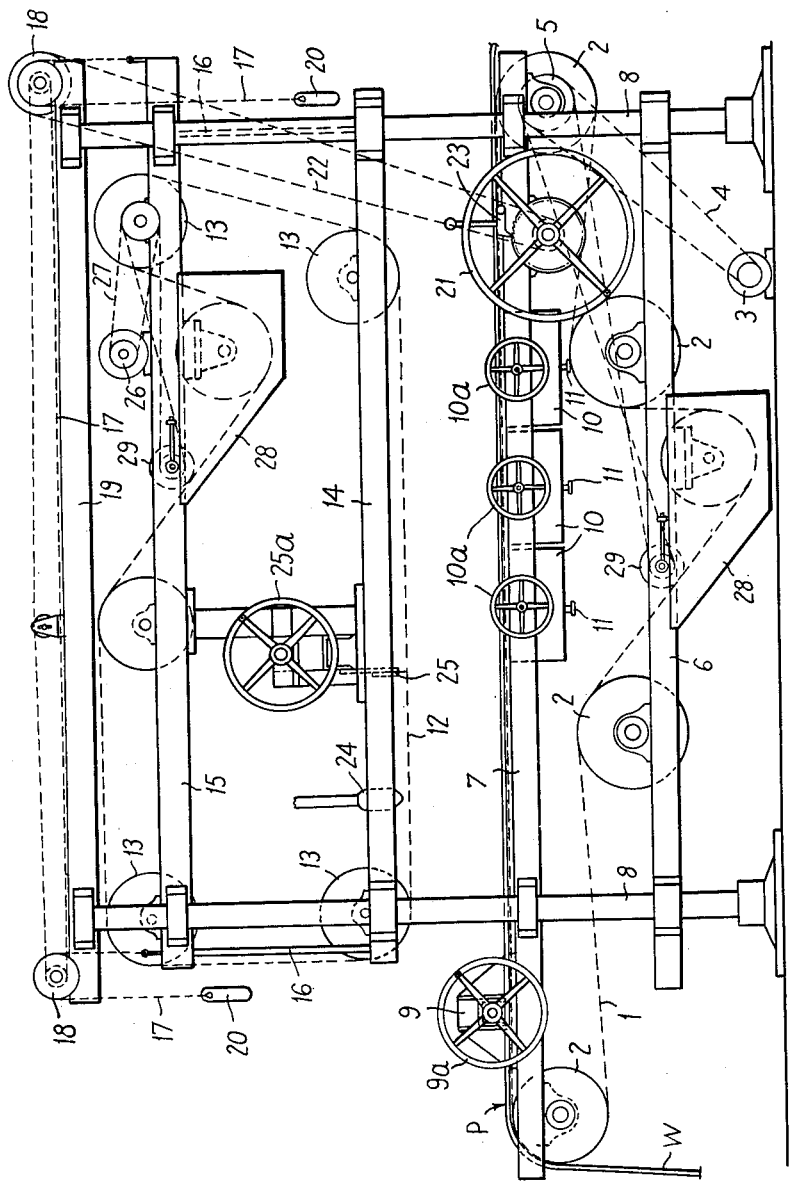
Inventor
Douglas Roberts
By
Attorneys 3,084,661
Patented Apr. 9, 1963

1

3,084,661
PROCESS AND APPARATUS FOR IMPREGNATING FIBROUS MATERIALS
Douglas Roberts, Worcestershire, England, assignor to Witco Chemical Company Limited, London, England, a company of England
Filed May 23, 1960, Ser. No. 30,787
Claims priority, application Great Britain June 1, 1959
1 Claim. (Cl. 118—50)

The present invention relates to a process and apparatus for manufacturing impregnated woven or non-woven fibrous sheet materials and more particularly to improvements in or modifications of the process and apparatus described in my specification Serial No. 3,042,573.

According to the process described in the aforementioned copending applications, an impregnant in the form of a foam is applied on to one surface of a fibrous sheet material and suction is applied to the opposite surface of the fibrous sheet material to suck the impregnant into said fibrous sheet material. When operated as a continuous process, a strip or web of the fibrous sheet material is fed on a perforated conveyor past a position at which one surface of the material is coated with a foamed impregnant to a position in which suction is applied to the opposite surface of the fibrous sheet material through the perforations in the conveyor to suck the impregnant into the material.

According to the present invention, instead of applying the foamed impregnant directly on to one surface of the fibrous sheet material it is applied on to a perforated support, which may be a mesh or lattice, positioned in contact with or close to the upper surface of the material so that when suction is applied to the opposite surface of the material the impregnant is sucked into the material. As applied to a continuous process, the upper perforated support may consist of a perforated conveyor on to which the foamed impregnant is deposited, the height of this upper conveyor being adjusted so that it just contacts or is very close to the upper surface of the material to be impregnated which is travelling on a lower perforated conveyor, whereby the fibrous sheet material is sandwiched between the two conveyor belts at least over the area in which suction is applied to the lower surface of the fibrous sheet material to suck the foamed impregnant into the material. The impregnated material may be dried or cured, as necessary.

According to a feature of the invention, the upper perforated support or conveyor may form a template or stencil having apertures arranged according to a desired pattern so that the fibrous sheet material is only impregnated in the areas of the apertures in the template or stencil and the impregnation is therefore effected according to the desired pattern. The upper conveyor carrying the pattern may be made of a natural or synthetic rubber or rubber-like material. With such an arrangement the upper and lower conveyors must travel at the same speed and preferably, the driving means for the upper conveyor and the lower conveyors are synchronised so that the two conveyors move at exactly the same speed, at least over the area in which the impregnant is sucked into the fibrous sheet material.

The upper conveyor is preferably an endless conveyor carried on supports which are arranged so that the upper conveyor can be raised and lowered with respect to the lower conveyor, in order to adjust its position for use with fibrous sheet materials of varying thicknesses. Such an arrangement is advantageously constructed so that the upper conveyor can be raised sufficiently far away from the lower conveyor, in order that foamed impregnant can be applied directly to the upper surface of the fibrous sheet material on the lower conveyor member in cases where this is preferable, in the manner described in our aforementioned copending application.

By applying the foamed impregnant on to a perforated support mounted just above or in contact with the upper surface of the material to be impregnated, this material does not have to bear the weight of the foamed impregnant before it is sucked into the material. Thus it is possible to impregnate extremely light weight and fragile non-woven fibrous materials without substantially crushing them and which are not otherwise sufficiently strong to withstand even the light weight of a foamed impregnant applied directly on to their upper surface.

The arrangements according to this invention may also advantageously be employed for dyeing or printing on carpeting and other fibrous sheet materials by applying the dyestuff in the form of a foam on to the upper conveyor. With such an arrangement it is possible accurately to control the weight and deposition of the dyestuff. The dyestuff may consist for example of either a latex bound pigment dyestuff or a procion type dyestuff. A pigment dyestuff may consist of a pigment type water dispersion bound with a flexible acrylic or acrylonitrile type polymer making it substantially fast to laundering and cleaning processes.

Such an arrangement can either be employed for dyeing the fibrous material as a whole, or where an upper conveyor serving as a stencil for a pattern is employed, for producing a dyed pattern on the fibrous sheet material.

It will be appreciated that the process according to the present invention may be carried out with the materials described in our aforementioned copending application and may also embody any of the other features described in that application as desired.

In order that the invention may be more fully understood reference will now be made to the accompanying drawing which shows, somewhat diagrammatically, a side elevation of one form of impregnating apparatus according to the present invention.

Referring to the drawing, the machine consists of an endless perforated conveyor belt 1, made for example of a wire mesh and shown in broken lines, which passes over guide rollers 2, and is driven by an electric motor 3 through a driving belt 4 passing over a pulley 5 on one of the rollers 2. The rollers are carried by horizontal supports 6 and 7 which are in turn mounted on vertical pillars 8. A web W of fibrous sheet material to be impregnated is fed on to the conveyor belt 1 from a roll or a web forming machine (not shown) and travels past an adjustable doctor blade 9 and over three suction boxes 10 connected to the outlet of a vacuum pump (not shown), these suction boxes having an aperture in their upper surface by means of which suction can be applied to the lower surface of the web of material W through the perforated conveyor belt 1.

The outlet aperture of each of the suction boxes is provided with means for adjusting the width of the aperture and thereby the width over which suction is applied so that the machine may successfully be used to impregnate fibrous sheet material of a width below the maximum which the machine can accommodate without excessive loss of suction occurring as would be the case if the web was narrower than the apertures in the suction boxes. Such means may consist of adjustable slides similar to those described in my specification Serial No. 3,042,573 controlled by the handwheels 10a.

The use of a vacuum pump provides an extremely effective source of suction for application to the fibrous sheet material. The degree of suction may be controlled by means of valves 11 connected to the suction boxes and which can allow air to be bled into the system to a controlled degree, thereby regulating the degree of suction at the outlet aperture of each of the suction boxes.

The apparatus so far described is basically similar to that described in our aforementioned copending applications and can in fact be operated in the same way by applying a foamed impregnant on to the upper surface of the web across its width at a position P to the left of the doctor blade 9, as shown in the drawing. The height of the doctor blade is adjustable by the handwheel 9a to control the thickness of the layer of foamed impregnant on the web and the material carrying the impregnant then travels past the suction boxes 10 at which position the impregnant is drawn into the fibrous material. The impregnated material then passes off the conveyor and is dried in an oven or by other means.

The machine according to the present invention however provides means whereby the foamed impregnant may be deposited on a perforated support on or adjacent the upper surface of the web to be impregnated, instead of directly on the web itself. To this end the machine includes a separate endless conveyor 12, which may also be a wire mesh, carried by rollers 13 mounted on horizontal supports 14 and 15 which are interconnected by struts 16 and are slidable together on the pillars 8. It will be understood that although only two of these pillars are seen in the drawing, two similar pillars as well as corresponding horizontal supports are provided at the opposite side of the machine for supporting the other ends of the rollers and other equipment carried by these supports. The upper conveyor assembly is supported by means of chains 17 attached at one end to the horizontal support 15 and passing over pulleys 18 carried by a beam 19, balance weights 20 being carried at the other end of the chains to counterbalance the weight of the upper conveyor assembly. The upper conveyor assembly carried by supports 14 and 15 can be raised and lowered by means of the handwheel 21 which drives one of the pulleys 18 through a chain drive 22. A pawl and ratchet arrangement 23 associated with the handwheel 21 enables the upper conveyor to be locked in any desired position.

The foamed impregnant is deposited on the upper conveyor 12 through a suitable nozzle or nozzles 24 extending across the width of the conveyor and the thickness of foamed impregnant is controlled by means of the adjustable doctor blade 25 carried by the horizontal supports 14, adjustment of the doctor blade being effected by the handwheel 25a. The foamed impregnant may be fed to the nozzle 24 through a flexible tube (not shown) so that this feed does not interfere with the raising and lowering of the conveyor assembly. The upper conveyor member is driven by the motor 26 through belt 27 and in operation the upper conveyor is arranged to travel at the same speed as the lower conveyor member. The drive between the two conveyors 1 and 12 may be synchronised or alternatively they may both be driven from the same drive means. Synchronous driving of the two conveyors is particularly desirable in the case where the upper conveyor takes the form of a pattern or stencil for producing patterned impregnation of the fibrous sheet material with a dyestuff or other impregnant, as previously described.

It will be apparent that if the upper conveyor assembly is lowered so that the upper conveyor just contacts the upper surface of the web W of fibrous sheet material on the lower conveyor and the foamed impregnant is deposited on the upper conveyor; then as the web of fibrous sheet material on the lower conveyor and the upper conveyor carrying the foamed impregnant travel together over the suction boxes 10, the suction applied to the undersurface of the fibrous sheet material through the lower conveyor will cause the impregnant to be drawn into the fibrous sheet material through the perforations in the upper conveyor.

It will be noticed that both the upper and lower conveyors pass through separate cleaning baths 28 in part of their travel, supported respectively by members 6 and 15, these baths serving to clean any impregnant from the mesh of the conveyors and prevent clogging of the apertures in the conveyors by the impregnant. The cleaning baths may contain water alone or may have a cleaning agent added thereto which helps remove the impregnant from the conveyor. A revolvable brush 29 is positioned at the outlet end of each bath which brushes the conveyor as it leaves the bath, thereby facilitating removal of traces of impregnant remaining on the conveyor.

Whilst a particular embodiment has been described it will be understood that various modifications may be made without departing from the scope of this invention as defined in the appended claim. Thus various other arrangements may be employed for supporting and raising and lowering the upper conveyor with respect to the lower conveyor besides that specifically described. For example, instead of employing the simple manually operated raising and lowering means with counterbalance weights as shown, an hydraulically or electrically operated system may be employed.

I claim:

Apparatus for the manufacture of impregnated woven or non-woven fibrous sheet material comprising a lower endless perforated conveyor for supporting and transporting a web of fibrous sheet material in a horizontal direction, a suction aperture arranged below a portion of said lower conveyor, means for driving said lower conveyor, an adjustable doctor blade arranged above said lower conveyor, a supporting frame arranged above the lower conveyor and mounted for movement towards and away therefrom, an upper endless perforated conveyor carried by said supporting frame, means for driving the upper conveyor, means for applying a foamed impregnant on to the upper perforated conveyor, an adjustable doctor blade associated with said upper perforated conveyor, means for raising and lowering the upper conveyor and frame assembly and means for counter-balancing the upper conveyor and frame assembly.

References Cited in the file of this patent
UNITED STATES PATENTS

| | | |
|---|---|---|
| 917,030 | Erler | Feb. 17, 1908 |
| 1,513,969 | Cumfer et al. | Nov. 4, 1924 |
| 1,728,471 | Bratring | Sept. 17, 1929 |
| 2,134,041 | Hamm | Oct. 25, 1938 |
| 3,042,573 | Roberts | July 30, 1962 |